United States Patent
Tanaka et al.

(10) Patent No.: US 11,462,126 B2
(45) Date of Patent: Oct. 4, 2022

(54) WORK SUPPORT DEVICE AND WORK SUPPORTING METHOD

(71) Applicant: HITACHI, LTD., Tokyo (JP)

(72) Inventors: Akihide Tanaka, Tokyo (JP); Masanori Miyagi, Tokyo (JP); Kazumichi Hosoya, Tokyo (JP); Hiroki Murakami, Tokyo (JP); Masao Shimizu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 11 days.

(21) Appl. No.: 17/053,818

(22) PCT Filed: Mar. 4, 2019

(86) PCT No.: PCT/JP2019/008318
§ 371 (c)(1),
(2) Date: Nov. 9, 2020

(87) PCT Pub. No.: WO2020/012702
PCT Pub. Date: Jan. 16, 2020

(65) Prior Publication Data
US 2021/0264813 A1    Aug. 26, 2021

(30) Foreign Application Priority Data
Jul. 13, 2018 (JP) .............................. JP2018-132912

(51) Int. Cl.
*G09B 19/24* (2006.01)
*G09B 9/00* (2006.01)

(52) U.S. Cl.
CPC ............... *G09B 19/24* (2013.01); *G09B 9/00* (2013.01)

(58) Field of Classification Search
CPC .. G09B 19/24; G09B 19/003; A61B 2503/02; G08B 21/02
See application file for complete search history.

(56) References Cited

U.S. PATENT DOCUMENTS 9,610,036 B1 * 4/2017 De Sapio ............... G16H 20/30
9,833,197 B1 * 12/2017 Elhaway ............. A61B 5/0022
(Continued)

FOREIGN PATENT DOCUMENTS

| JP | 06-274095 A | 9/1994 |
| JP | 2002-333826 A | 11/2002 |

(Continued)

OTHER PUBLICATIONS

International Search Report, PCT/JP2019/008318, dated May 14, 2019, 2 pgs.

*Primary Examiner* — Robert J Utama
(74) *Attorney, Agent, or Firm* — Volpe Koenig

(57) ABSTRACT

A control device is provided with: a posture information storage unit that stores posture associated information associated with workability being an evaluation criterion at a time of a posture for each piece of posture information of an operator; a posture information detection unit that acquires posture information of the operator during work as current posture information; a posture information calculation unit that obtains, from the posture associated information, ideal posture information for making improvement on workability of the current posture information, obtained by referring to the posture associated information in the storage unit from the current posture information; and a posture information notification unit that notifies the ideal posture information obtained by the calculation unit as an improvement proposal.

11 Claims, 9 Drawing Sheets

(56) References Cited

U.S. PATENT DOCUMENTS

| | | | |
|---|---|---|---|
| 2011/0060248 A1* | 3/2011 | Ishida | A61B 5/1116 600/587 |
| 2014/0282105 A1* | 9/2014 | Nordstrom | G09B 19/003 715/753 |
| 2015/0056585 A1 | 2/2015 | Boulware et al. | |
| 2017/0296099 A1* | 10/2017 | Hancock | A61B 5/4561 |

FOREIGN PATENT DOCUMENTS

| | | |
|---|---|---|
| JP | 2005-134536 A | 5/2005 |
| JP | 2006-171184 A | 6/2006 |
| JP | 2013-088730 A | 5/2013 |

\* cited by examiner

WORK SUPPORT DEVICE AND WORK SUPPORTING METHOD

TECHNICAL FIELD

The present invention relates to a work support device and a work support method.

BACKGROUND ART

The environment for manufacturing is being changed greatly in accordance with the recent social situation. Due to an increase in overseas production, an increase in the number of products procured from overseas, and a decrease in the number of skilled technicians, it has become difficult to maintain manufacturing skills, bringing quality control into more difficult situations. To date, skills have been handed down through direct instruction from skilled technicians.

However, because a means to convey skills are not sufficient and the instruction is often sensuous, the guidance takes time or is transmitted incorrectly, and hence there is a concern that the skills may not be completely handed down and lost.

On the other hand, with the development of measurement technology in recent years, efforts have been made to measure and evaluate skills. For example, efforts are being made to measure and evaluate the work of a subject by using various measuring instruments. The measured data is compared with data measured in the past to evaluate the quality, and methods used for quality control and training of welding work have been proposed.

PTL 1 discloses a device for evaluating the skill level of an operator who needs to acquire the skill of work when hand welding is performed.

The skill evaluation result presentation device measures the state of work related to the work for which the skill to be evaluated is required, and presents, as the evaluation result, an index obtained from the result of comparing a specific significant pattern obtained from quantitative behavior data and work state data with a pattern of model data stored in a pattern storage device which stores previously established model data and information on the data range and pattern of the model data.

CITATION LIST

Patent Literature

PTL 1: JP 2006-171184

SUMMARY OF INVENTION

Technical Problem

Even with the same work result, the degree of fatigue and the degree of safety vary depending on the posture during work. That is, a skilled operator works in a safe and posture that hardly causes fatigue and can thus work stably for a long time. Hence it is important to learn an ideal work posture separately from the learning of the work contents, but no proposal has been made to support the learning of the work posture.

For example, it has not been possible to evaluate the posture by the method of PTL 1. That is, in PTL 1, although there is a function of indicating a posture of an operator during work, a position relative to a work target, and a standard deviation of the position, it has not been possible to determine the posture that the operator can work to stabilize the operation, perform the work with less fatigue, and the like.

Therefore, it is an object of the present invention to provide a work support system suitable for improving the work posture of an operator.

Solution to Problem

In order to solve the above problem, the work support device of the present invention has the following features:

The present invention is provided with: a storage unit that stores posture associated information associated with workability being an evaluation criterion at a time of a posture for each piece of posture information of an operator; a detection unit that acquires posture information of the operator during work as current posture information; a calculation unit that obtains, from the posture associated information, ideal posture information for improving workability of the current posture information, obtained by referring to the posture associated information in the storage unit from the current posture information, with respect to the workability; and a notification unit that notifies the ideal posture information obtained by the calculation unit as an improvement proposal.

Other means will be described later.

Advantageous Effects of Invention

According to the present invention, it is possible to provide a work support system suitable for improving the work posture of an operator.

DESCRIPTION OF EMBODIMENTS

Hereinafter, one embodiment of the present invention will be described in detail with reference to the drawings.

First Embodiment

Figure 1:
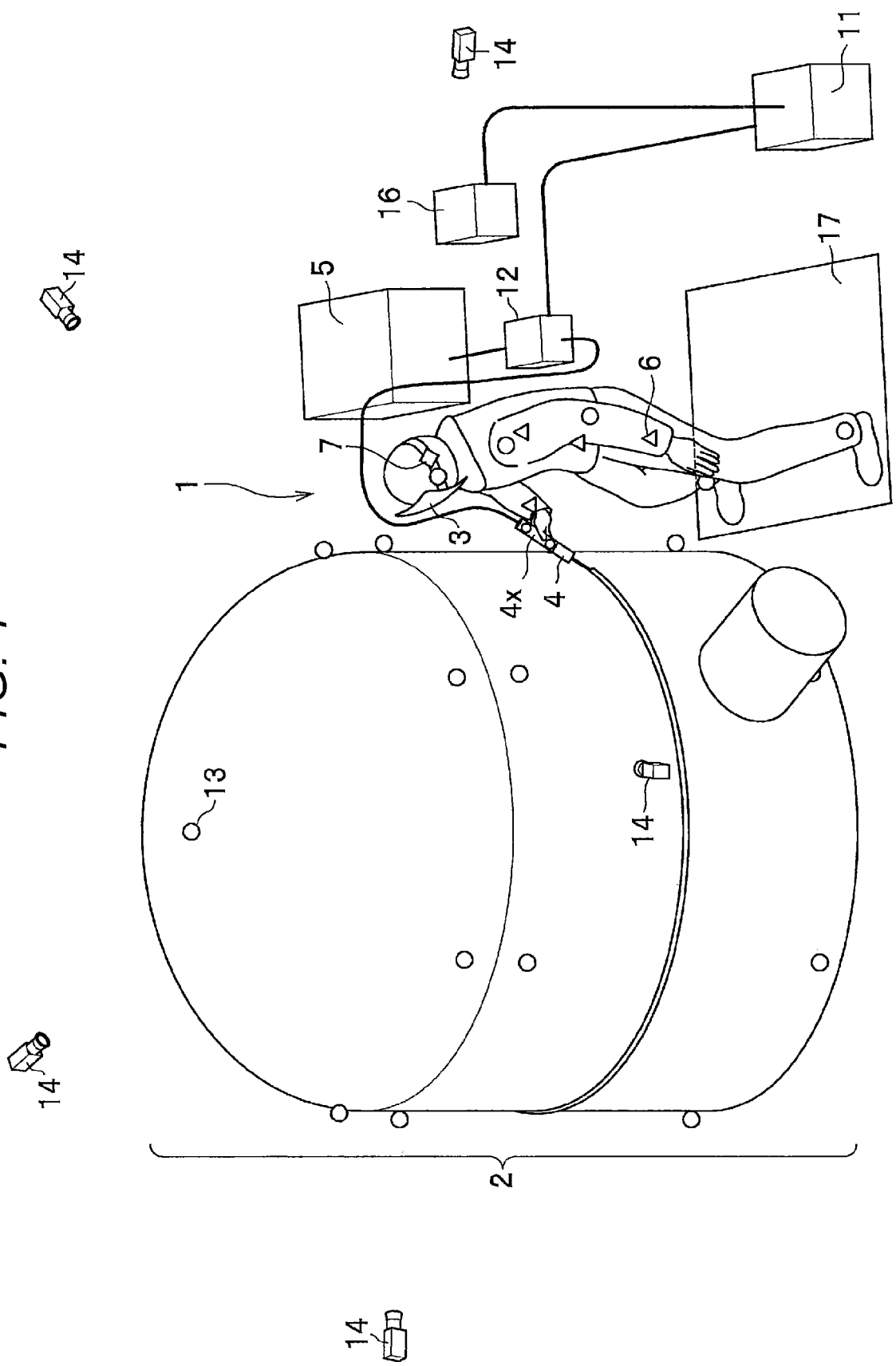
FIG. 1 is an overall view of a work support system according to one embodiment of the present invention.

FIG. 1 shows an overall view of the work support system.

The work support system supports the welding work of a welder 1. The work support system can be used in a scene where a human or a robot works industrially in a certain posture. Note that the work to be supported include, but are not limited to, welding, brazing, grinding, painting, casting, and polishing.

The welder 1 is an operator who performs semi-automatic welding of the welding target 2. The welder 1 grips a torch 4 provided with an absorbing film 4x and connects a welding target 2 with a welding material that has melted due to heat generated by an arc. For protecting the eyes from the arc (light emission) from the tip of the torch 4, a light-shielding surface 3 is attached to the face of the welder 1.

In a welding work site shown in FIG. 1, in addition to welding equipment, equipment for work support is provided.

In order to measure detailed data on the welder 1 at the time of work, a myoelectric sensor 6 (triangular in the figure) for measuring the amount of activity of muscle at the time of work is attached to each part of the body of the welder 1. A simple electroencephalograph 7 for measuring brain waves of the welder 1 is also attached near the light-shielding surface 3.

The welder 1 at the time of work is on a force plate 17 configured to measure an external force such as a floor reaction force.

The control device (work support device) 11 is connected to each measurement device (environment measurement device 16, marker measuring camera 14, and electric measurement device 12) and controls the operation of each measurement device. Although a communication cable between the control device 11 and five marker measuring cameras 14 is not shown, a communication means between the control device 11 and the marker measuring cameras 14 may be wireless communication or wired communication.

A semi-automatic welding power source 5 supplies welding power to the torch 4. The electric measurement device 12 measures a welding current and a welding voltage as electric power supplied from the semi-automatic welding power source 5.

The environment measurement device 16 measures, for example, temperature, humidity, wind force, and the like as environmental data of the work site.

The marker measuring camera 14 is a light irradiation unit disposed around the welder 1 and the welding target 2. The marker measuring camera 14 can set a wavelength of light of 350 nm to 11 μm (850 nm in the present embodiment) to avoid the wavelength of light during arc welding and can perform irradiation with light.

The marker measuring camera 14 photographs the markers 13 (spherical in the figure) arranged at respective places in the work site and acquires respective positions of the markers 13 from the photographed images by motion capture. The marker 13 is preferably coated with a paint that reflects light.

The marker 13 is attached to each of the welding target 2, the torch 4, or the like. Further, the marker 13 is provided on each of the welder 1, the light-shielding surface 3, a filler material, and the like, so that more detailed coordinate data can be obtained.

Figure 2:
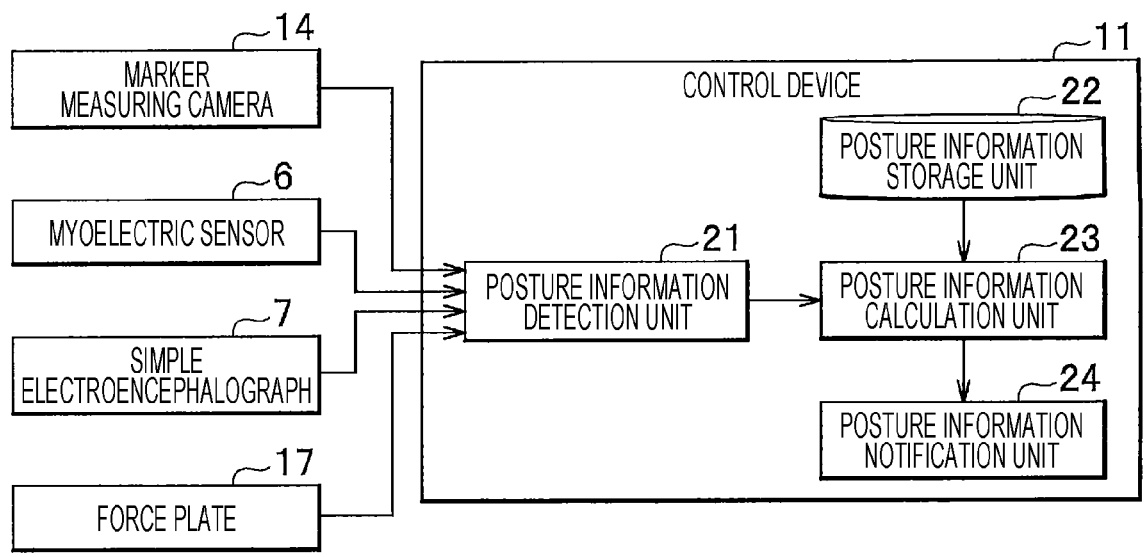
FIG. 2 is a configuration diagram showing a detail of a control device according to one embodiment of the present invention.

FIG. 2 is a configuration diagram showing a detail of the control device 11.

The control device 11 is configured as a computer having a central processing unit (CPU), a memory, a storage means (storage unit) such as a hard disk, and a network interface.

By the CPU executing a program (also referred to as application or App as its abbreviated word) read into the memory, the computer causes a control unit (control means), made up of each processing unit, to operate.

The control device 11 includes a posture information detection unit 21, a posture information storage unit 22, a posture information calculation unit 23, and a posture information notification unit 24 as devices that evaluate posture information (hereinafter referred to as "current posture information") of the welder 1 during work.

The posture information detection unit 21 acquires measurement data on the welding work of the welder 1 from the various measurement devices described with reference to FIG. 1. The measurement data acquired by the posture information detection unit 21 will be exemplified below.

The height of the torch 4, the angle of the torch 4, the angle of the elbow of an arm with the torch 4, the average moving speed of the torch 4, the weaving conditions, the supply amount of the filler material, the position of the head of the welder 1, and the like as the measurement data from the marker measuring camera 14

The amount of activity of the muscle at the time of work and the fatigue degree of the muscle as the measurement data from the myoelectric sensor 6

Brain waves at the time of work as the measurement data from the simple electroencephalograph 7

An external force such as a floor reaction force as the measurement data from the force plate 17

As measurement data from the electric measurement device 12, welding condition data such as a current value and a voltage value Environmental data such as temperature, humidity, and wind force as measurement data from the environment measurement device 16

Note that the measurement data is not limited to visual information (image), but the auditory information (sound) and the tactile information (heat, pressure) may also be handled as a signal of the movement of the operator, a signal emitted from the body, and a signal of mechanical information. Further, the posture information detection unit 21 for handling the measurement data is achieved as, for example, a marker type motion capture device, an acceleration/angular velocity/geomagnetism measurement device, a global positioning system (GPS), and an indoor global positioning system (indoor GPS).

The posture information detection unit 21 detects the following current posture information from the acquired measurement data alone or in combination of two or more pieces of measurement data and notifies the posture information calculation unit 23 of the detection result.

the way of walking during operation, the movement of the arms, and the like as the movement of welder 1 the way of holding the tools such as the torch 4, the positions and angles of the head, arms, waist, legs, and the like as the posture of the welder 1. Note that the posture can be evaluated by the following methods, for example.

The evaluation can be obtained from the average, the maximum value, or the like of the voltage generated from the myoelectric sensor 6.

There is a method of obtaining joint power and the like by performing inverse dynamic analysis from kinematic data of posture obtained from the marker 13 and the floor reaction force obtained from the force plate 17.

The posture information storage unit 22 is a database in which workability, which is an evaluation criterion at the time of a posture for each posture information, is associated as posture associated information. Examples of the workability at the time of the posture include the following.

Stability of operations that actually influence the work such as torch speed and weaving cycle A fatigue degree at the time of work Safety such as protection from an arc The degree of physical and mental distress at the time of work Versatility for another work such as other fittings Note that the methods of calculating the workability registered in the posture information storage unit 22 include the following:

A relational expression between the feature amount of the posture and the workability at the time of the posture A method of extracting from the feature amount of data obtained by the detection unit A method of the calculation based on the skeleton In addition, only posture associated information may be registered in the posture information storage unit 22, or measurement data for obtaining the posture associated information may also be registered together. For example, the posture information obtained from the angle of the elbow of an arm with the torch 4 and the posture associated information with the workability being the amount of activity of the elbow of an arm with the torch 4 torch are registered in the posture information storage unit 22 before work. At the time of work, the posture information calculation unit 23 uses the current posture information obtained from the angle of the elbow of the welder 1 as a search key to obtain the corresponding amount of activity of the elbow from the posture information storage unit 22. Thus, the amount of activity of the elbow can be indirectly obtained without attaching the myoelectric sensor 6 to the welder 1 at the time of work.

As thus described, the posture information calculation unit 23 refers to the database of the posture information storage unit 22 based on the current posture information detected by the posture information detection unit 21 and evaluates the workability of the current posture information.

Then, the posture information notification unit 24 notifies a user such as the welder 1 of the workability of the current posture information evaluated by the posture information calculation unit 23. As the contents of the notification, an improvement proposal such as indicating a correct posture (hereinafter referred to as "ideal posture information") with improved workability may be notified, or a break may be taken during long hours of work, or attention information for safety may be notified.

Further, the notification format of the posture information notification unit 24 may be sound information such as sounding an alarm or reproducing a mechanical sound, screen information obtained by graphing the posture associated information (cf. FIGS. 7 and 8), or a warning may be notified by vibration from the torch 4.

Figure 3:
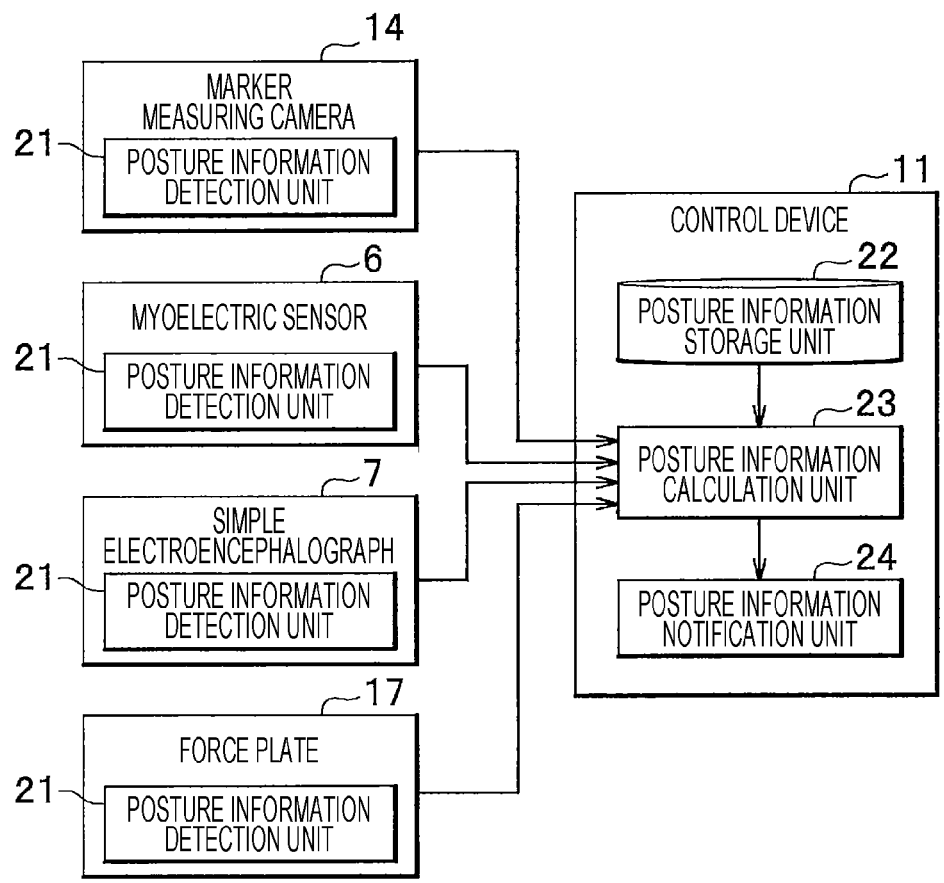
FIG. 3 shows a modification of the control device of FIG. 2 according to one embodiment of the present invention.

FIG. 3 shows a modification of the control device 11 of FIG. 2. In FIG. 2, the posture information detection unit 21 in the control device 11 has received measurement data from various measurement devices such as the marker measuring camera 14.

On the other hand, in FIG. 3, the posture information detection unit 21 is incorporated in the measurement device, whereby the data transmitted from the posture information detection unit 21 to the control device 11 is replaced with the posture information from the measurement data. Thus, the amount of data communication can be reduced.

The outline of the work support system has been described with reference to FIGS. 1 to 3. Hereinafter, with reference to FIGS. 4 to 8, a specific example in which the workability of the elbow fatigue is evaluated based on the posture information of the elbow position at the time of welding work will be described.

Figure 4:
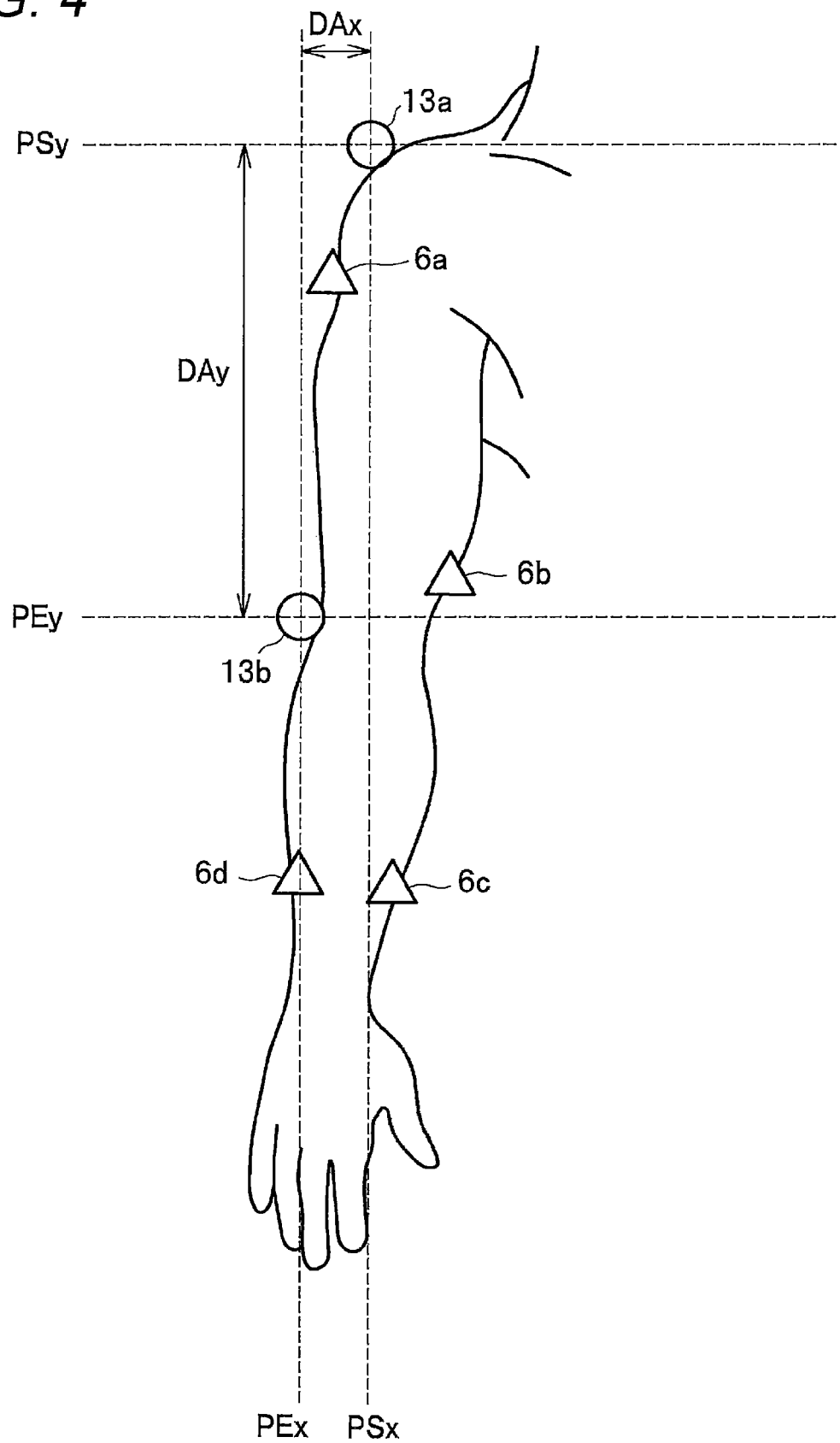
FIG. 4 is an explanatory view showing an attachment position of a measurement device attached from the right arm to a right shoulder of a welder according to one embodiment of the present invention.

FIG. 4 is an explanatory view showing the attachment position of the measurement device attached from the right arm to the right shoulder of the welder 1.

A right shoulder marker 13*a* and a right elbow marker 13*b* are attached to the welder 1. Myoelectric sensors 6*a*, 6*b*, 6*d*, 6*c* are attached to the welder 1 in order from the top at the positions of the main muscles of the right arm.

In the following description, a right-arm-to-right-shoulder lateral width DAx and a right-arm-to-right-shoulder height DAy are used. The lateral width is the width in the shoulder width direction of the welder 1, and the height is the width in the height direction of the welder 1.

The right-arm-to-right-shoulder lateral width DAx is a distance between the lateral width position PSx of the marker 13*a* and the lateral width position PEx of the marker 13*b*. The right-arm-to-right-shoulder height DAy is the distance between a height position PSy of the marker 13*a* and a height position PEy of the marker 13*b*.

Figure 5:
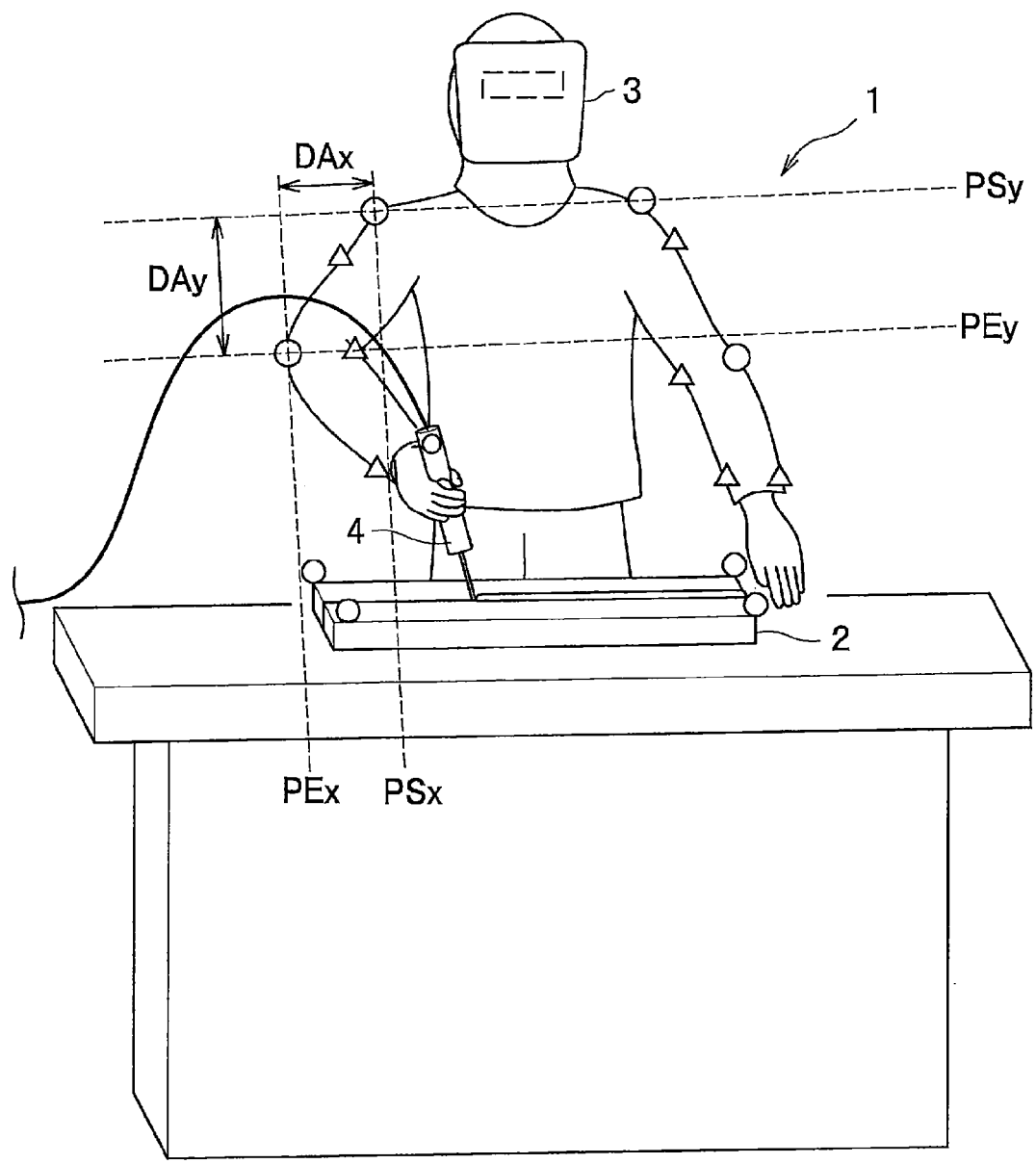
FIG. 5 is an external view of a welder when he or she is working in a posture that hardly causes fatigue according to one embodiment of the present invention.

FIG. 5 is an external view of the time the welder 1 when he or she is working in a posture that hardly causes fatigue. The posture information detection unit 21 obtains the right-arm-to-right-shoulder lateral width DAx and the right-arm-to-right-shoulder height DAy described with reference to FIG. 4 based on the position information of the marker 13 measured by the marker measuring camera 14.

The posture information calculation unit 23 determines that the current welder 1 is working in a posture that hardly causes fatigue because the difference between the right-arm-to-right-shoulder lateral width DAx obtained by the posture information detection unit 21 and the right-arm-to-right-shoulder lateral width at the time of the posture that hardly causes fatigue, having been registered in the posture information storage unit 22, is small. In this case, the posture information notification unit 24 need not notify the current welder 1.

Figure 6:
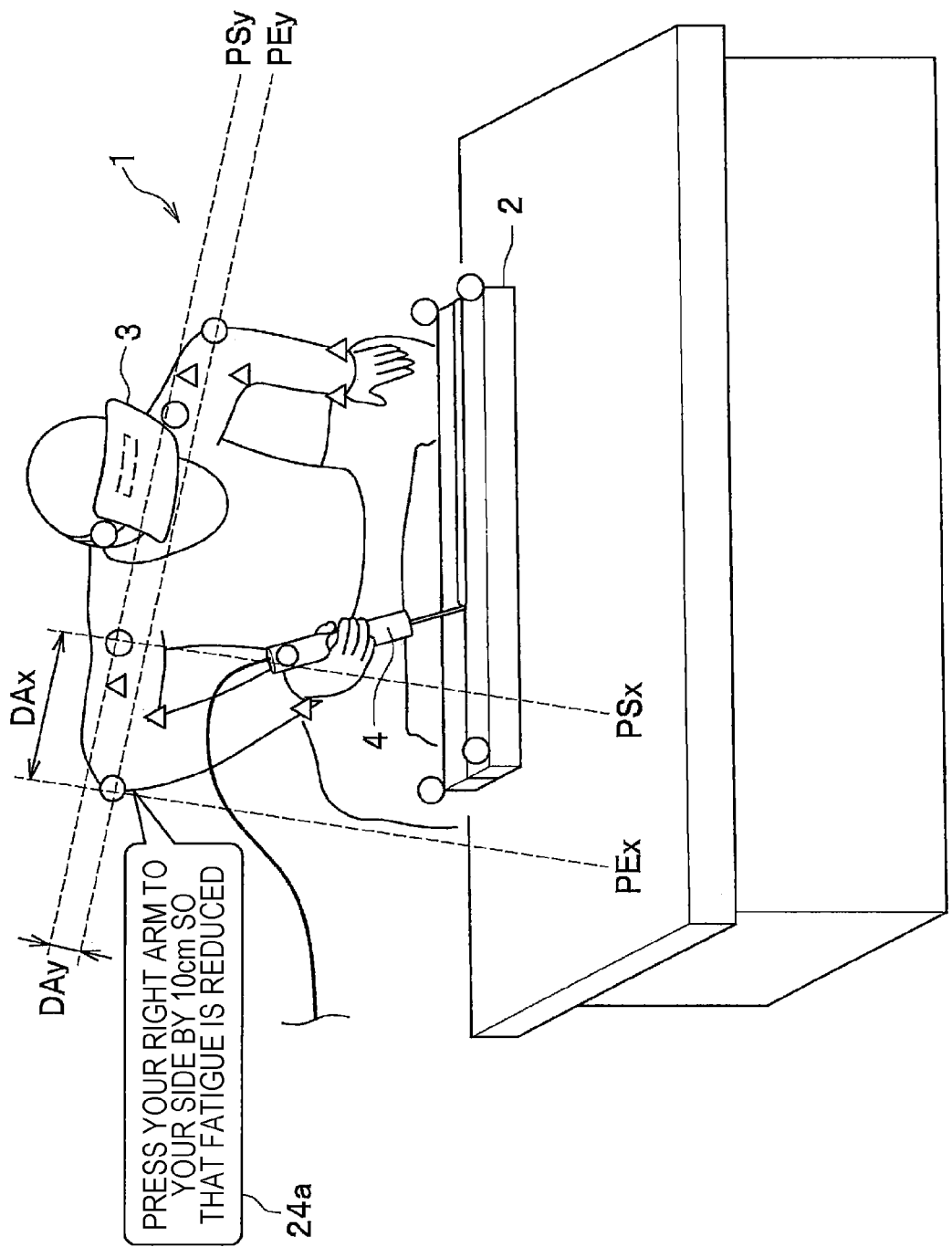
FIG. 6 is an external view of the welder when he or she is working in a posture that easily causes fatigue according to one embodiment of the present invention.

FIG. 6 is an external view of the welder 1 when he or she is working in a posture that easily causes fatigue. As in FIG. 5, the posture information detection unit 21 obtains the right-arm-to-right-shoulder lateral width DAx.

The posture information calculation unit 23 determines that the current welder 1 is working in a posture that easily causes fatigue because there is a large difference between (a) the right-arm-to-right-shoulder lateral width DAx obtained by the posture information detection unit 21 and (b) the right-arm-to-right-shoulder lateral width at the time of the posture that hardly causes fatigue that has been registered in the posture information storage unit 22. In this case, the posture information notification unit 24 notifies an improvement proposal 24a registered in the posture information storage unit 22 so that the posture can be shifted to a posture that hardly causes fatigue.

Figure 7:
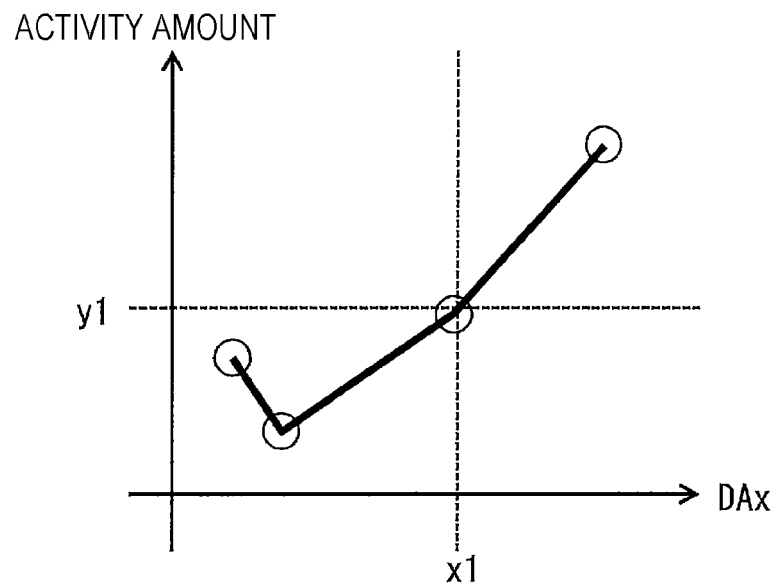
FIG. 7 is a graph of an evaluation curve showing an example of posture associated information stored in a posture information storage unit according to one embodiment of the present invention.

FIG. 7 is a graph of an evaluation curve showing an example of the posture associated information stored in the posture information storage unit 22. The horizontal axis of the graph indicates the right-arm-to-right-shoulder lateral width DAx, which is posture information such as the current posture information, and the vertical axis of the graph indicates the amount of activity of the right arm muscle, which is workability. The amount of activity is, for example, a numerical value obtained by averaging the absolute values of myoelectric potentials, and the smaller the numerical value, the less the fatigue and the higher the evaluation.

The graph of the evaluation curve shows a tendency that the amount of activity is less in a state where there is a slight space between the arm and the side of the body than in a state where there is no space therebetween, and thereafter, the amount of activity tends to increase as the space therebetween increases. For example, when the right-arm-to-right-shoulder lateral width DAx of the current welder 1 as shown in FIG. 6 is x1, a point y1 on the graph corresponding to x1 is the amount of activity of the current welder 1.

Figure 8:
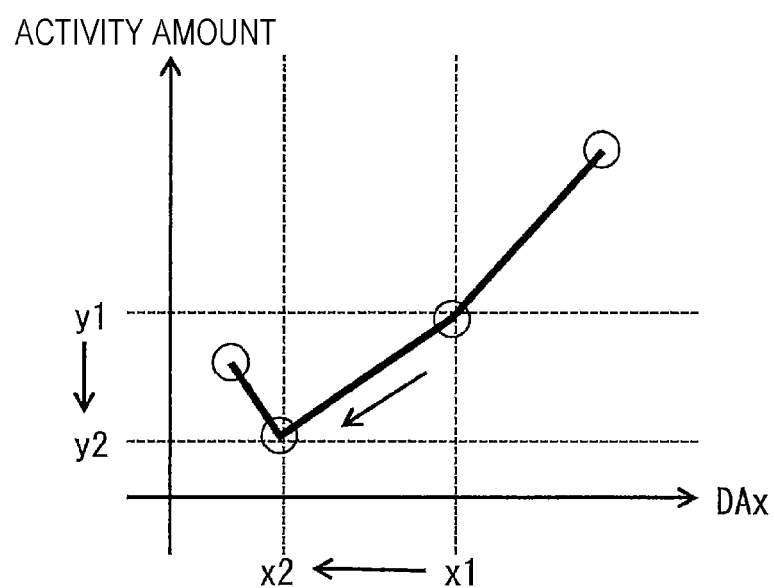
FIG. 8 is a specific example of a process in which the posture information calculation unit creates the improvement proposal of FIG. 6 based on a graph of the evaluation curve of FIG. 7 related to one embodiment of the present invention.

FIG. 8 is a specific example of the process in which the posture information calculation unit 23 creates the improvement proposal 24a of FIG. 6 based on the graph of the evaluation curve of FIG. 7.

The posture information calculation unit 23 traces the graph in a direction (i.e., in a lower left direction indicated by an arrow) in which the amount of activity of the vertical axis improves, starting from a graph point (x1, y1) indicating the current posture information. Then, the posture information calculation unit 23 acquires a peak point such as a graph point (x2, y2) as material data of the improvement proposal 24a as ideal posture information that can sufficiently improve the amount of activity.

Further, the posture information calculation unit 23 sets the difference (in FIG. 6, "press your right arm to your side by 10 cm") from the current posture information=x1 to the ideal posture information=x2 as an item for improvement, and sets the difference from the amount of activity of the current posture information=y1 to the amount of activity of the ideal posture information=y2 as the improvement effect (in FIG. 6, "fatigue is reduced). As described above, the posture information calculation unit 23 can evaluate the posture with respect to the way of keeping the space between the arm and the side by using the graph of the evaluation curve and can propose an optimal working posture for a person who is in a posture that easily causes fatigue.

The control device 11 may, after obtaining the optimal posture by the above means, correct the posture to be the optimal posture by using a correction jig or the like, and efficiently educate the posture. Further, the control device 11 may obtain the fatigue degree of the welder 1 based on the ease of fatigue at the time of work, the work time, and the like, or may recognize a change in posture caused by fatigue, and may issue a warning such as urging the welder 1 to take a break when recognizing that the welder 1 is in a fatigued state.

As described above, in the work support system of the first embodiment, it is possible to propose to the operator the posture that the operator can work while being hardly fatigued. Although the amount of activity of muscle has been described in the first embodiment, the evaluation can also be performed in the same manner based on the stability of the operation.

Second Embodiment

In the first embodiment, as a graph of the evaluation curve of FIG. 7, one type showing a tendency in the welder 1 with a standard physique has been illustrated. In a second embodiment to be described below, a description will be given of a form in which the difference in types of individual users, such as the welder 1 with a large physique or the welder 1 with a small physique, is taken into consideration. The type described below is intended to describe differences among individual operators and is not limited to the physique. A different type may refer to a difference in the way a tool like a torch is held, the angle of the torch, or the position of the feet or the head.

Figure 9:
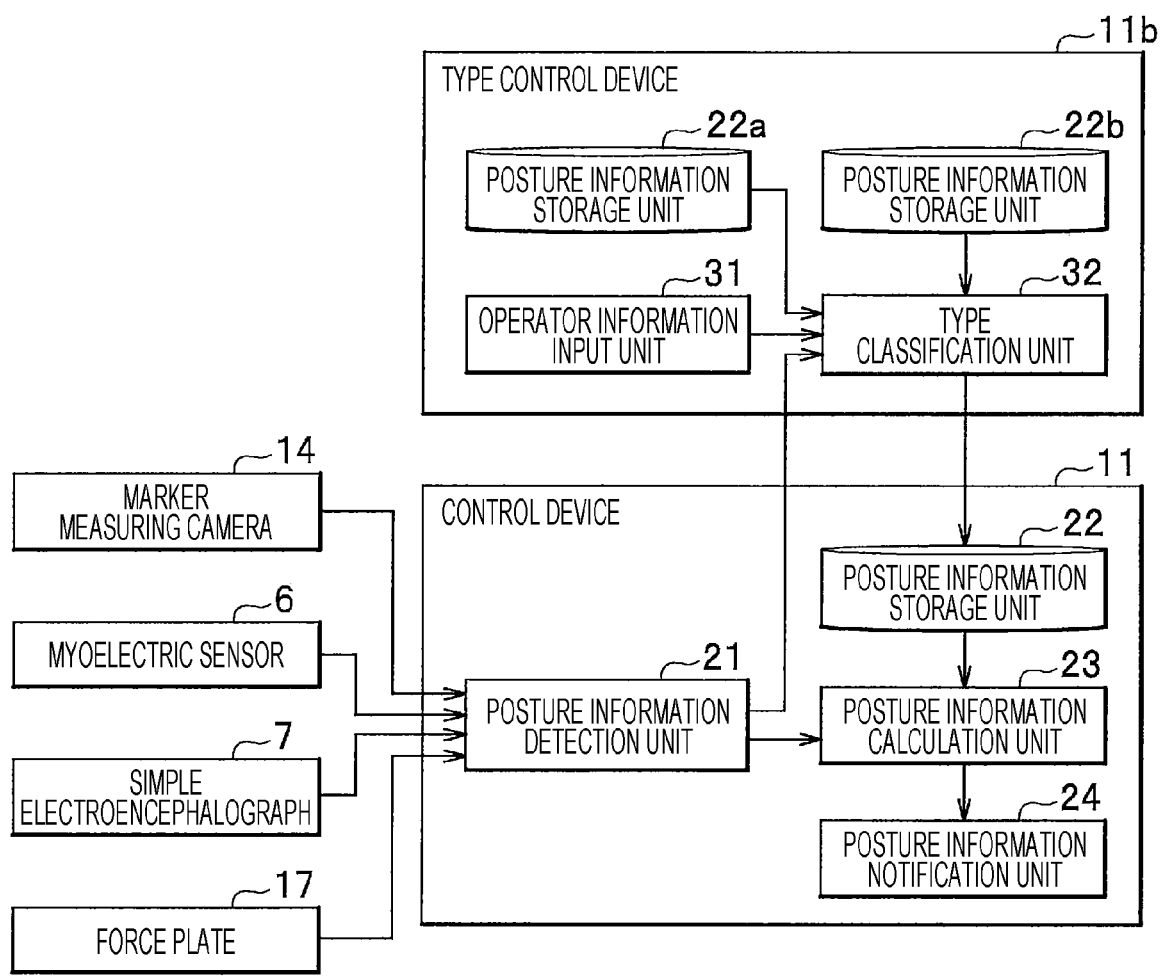
FIG. 9 is a configuration diagram showing a detail of a type control device for associating a control device according to one embodiment of the present invention with an individual type.

FIG. 9 is a configuration diagram showing a detail of a type control device 11b for associating the control device 11 with an individual type.

The type control device 11b includes posture information storage units 22a, 22b by type, an operator information input unit 31, and a type classification unit 32.

The operator information input unit 31 receives input of operator information serving as a clue for classifying the type of welder 1. The operator information includes, for example, a physique, sex, age, a length of service, a department to which the operator belongs, a region to which the operator belongs, person who taught the operator, the way of holding a tool, a school, and the like. Alternatively, the operator information input unit 31 may cause the operator to directly select the type on an operation screen.

The type classification unit 32 specifies the type of the operator based on the operator information of the operator information input unit 31 and selects the posture information storage unit 22a or posture information storage unit 22b corresponding to the specified type. The type classification unit 32 may specify the type of the operator based on not only static information such as the operator information but also dynamic information such as the posture information detected by the posture information detection unit 21 from the welding welder 1 during work.

The type classification unit 32 reflects the posture information storage unit 22a or posture information storage unit 22b, which is suitable for the specified type of the operator, as the posture information storage unit 22 to be used in the control device 11.

Thus, the control device 11 of the second embodiment can achieve the work support suitable for the type of the operator by using the type control device 11b. That is, even when the posture, the way of holding the tool, and other techniques that facilitate the work differ depending on the operator, the ideal posture is not limited to one type, and a proposal suitable for each operator can be made.

Further, in the step of correcting the posture to be an ideal posture by using the correction jig or the like described in the first embodiment, the correction jig or the like can be used for each type.

Figure 10:
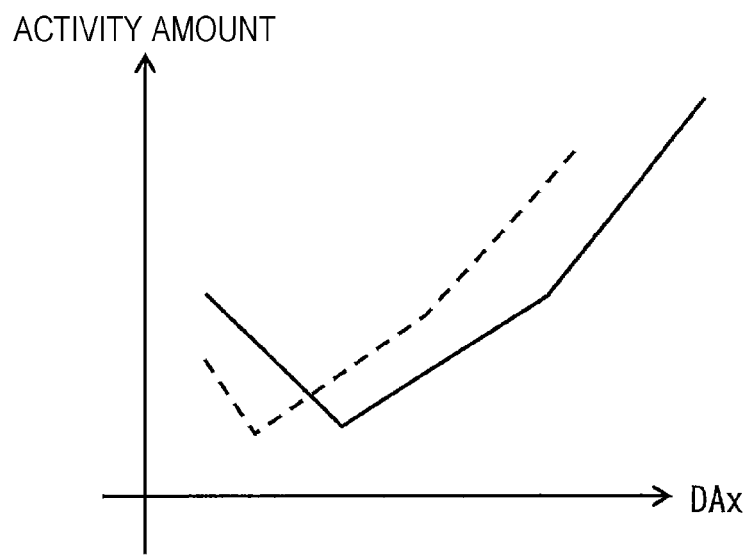
FIG. 10 is a graph of an evaluation curve for an operator with a large physique according to one embodiment of the present invention.

FIG. 10 is a graph of an evaluation curve for an operator with a large physique as an example of the posture information storage unit 22a for each type. When the graph of the standard body type in FIG. 7 is a broken line, a solid-line graph of an operator with a large physique has an ideal posture in a state in which the space between the arm and the side is made wider because the right arm is long.

Figure 11:
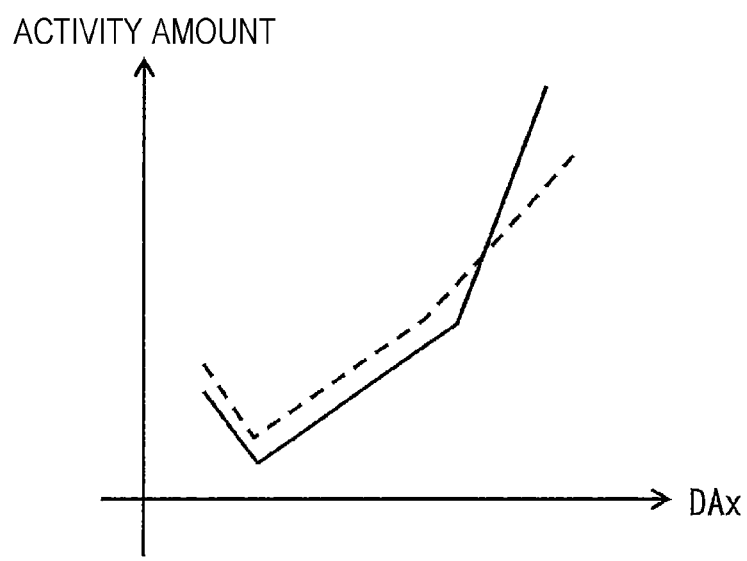
FIG. 11 is a graph of an evaluation curve for an operator with a small physique according to one embodiment of the present invention.

FIG. 11 is a graph of an evaluation curve for an operator with a small physique as an example of the posture information storage unit 22b for each type. When the graph of the standard body type shown in FIG. 7 is a broken line, a solid-line graph of an operator with a small physique increases the amount of activity rapidly when the space between the arm and the side is widely opened because the right arm is short.

Note that an administrator prepares in advance a graph of the evaluation curve, which is created by conducting a separate experiment, as the posture information storage units 22, 22a, 22b. The posture information detection unit 21 may update the graph of the evaluation curve based on the history of the detected posture information.

Third Embodiment

In the work support system of each of the first and second embodiments, practical support for the welder 1 who performs welding work by emitting arc light from the torch 4 in an actual welding site has been assumed. On the other hand, in a third embodiment, an application example of virtual training using simulated parts will be described as an educational system capable of training without actually welding.

Figure 12:
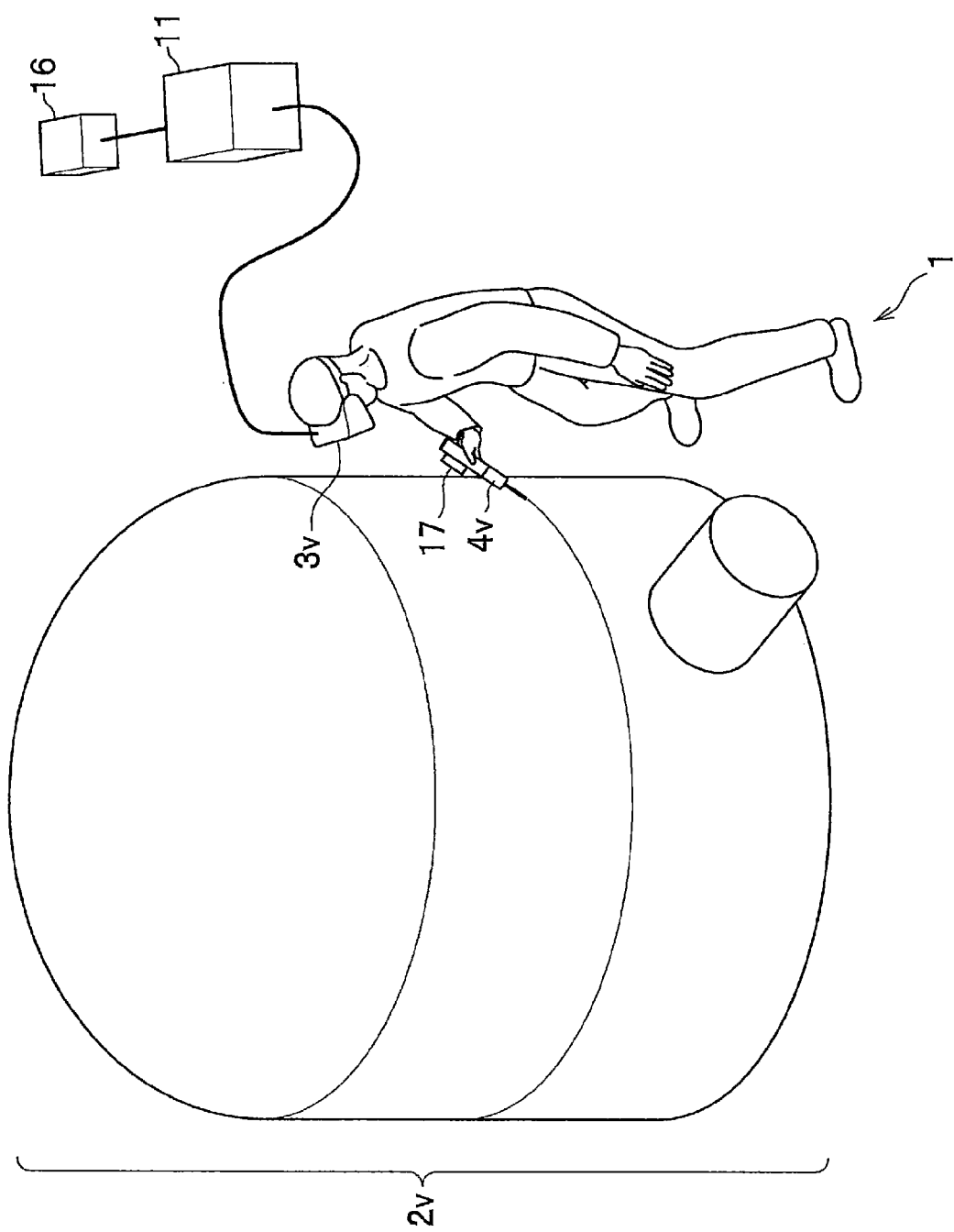
FIG. 12 is an overall view of an educational system according to one embodiment of the present invention.

FIG. 12 shows an overall view of an educational system. In this educational site, a welding-target simulated part 2v is disposed in place of the welding target 2.

The welder 1 grips a simulated torch 4v instead of gripping the torch 4. The simulated torch 4v is a control device in a virtual system, and the force plate 17 is also provided.

In the first embodiment, the marker 13 on the torch 4 has been photographed by the marker measuring camera 14 to obtain accurate position information of the marker. On the other hand, in the third embodiment, by using a stereo camera instead, the positional relationship between the simulated torch 4v and the welding-target simulated part 2v in the three-dimensional space can be acquired.

The welder 1 wears a head-mounted display 3v instead of attaching the light-shielding surface 3 to the face. The head-mounted display 3v displays the notification content of the posture information notification unit 24 from the connected control device 11. The head-mounted display 3v functions not only as an output means for simulating the state of the skill but also as an input means for measuring the work operation and posture information by using a mounted gyro sensor or the like.

Note that the measurement device such as an environment measurement device 16 is connected to the control device 11 as in the first embodiment.

Further, various pieces of information for simulating the welding work may be displayed on the head-mounted display 3v. For example, the simulated torch 4v has a switch for starting welding, and when the switch is pressed, it is recognized as being energized. In the energized state, when the torch tip is within a predetermined distance from the welding-target simulated part 2v, an arc is displayed on the head-mounted display 3v, which is a display unit, and a molten pool is displayed accordingly.

When the welder 1 moves the simulated torch 4v, the arc and the molten pool move accordingly. The control device 11 can reproduce an arc, a molten pool, a welding sound, and a welding current and voltage corresponding to the operation of the torch by referring to measurement data accumulated in the past. That is, on the head-mounted display 3v as the display unit, based on the generated coordinate data of the shape of the welding-target simulated part 2v and the work data stored in advance, it is possible to display a video image of the welding work in which the arc, the molten pool, the welding sound, and the welding current and voltage corresponding to the operation of the torch are reproduced.

As in the first and second embodiments, the posture information notification unit 24 evaluates the posture of the operator and notifies an ideal posture. At this time, the control device 11 may correct the posture to be an ideal posture by using a correction jig, holography, or the like, for efficient education.

Instead of adopting virtual reality (VR) using the head-mounted display 3v as the display unit, mixed reality (MR) using a HoloLens as the display unit may be adopted.

Further, an educational system combining the welding-target simulated part 2v and the torch 4 (on the site) may be constructed, or an educational system combining the welding target 2 (on the site) and the simulated torch 4v may be constructed.

As described above, in the educational system of the third embodiment, even a beginner who is unfamiliar with a work site can efficiently hand down skills, improve manufacturing quality, and contribute to a reduction in failure rate.

In each of the first to third embodiments of the present embodiment described above, the posture information calculation unit 23 compares the current posture information quantified by the posture information detection unit 21 with the posture associated information stored in the posture information storage unit 22 to calculate ideal posture information for improving workability The posture information notification unit 24 can contribute to the improvement of the work of the welder 1 by notifying the welder 1 during work of the ideal posture information as an improvement proposal Note that the present invention is not limited to the embodiments described above but includes various modifications. For example, the embodiments described above have been described in detail for the purpose of describing the present invention in an easy-to-understand manner and are not necessarily limited to those having all the configurations described above.

It is also possible to replace a part of the configuration of one embodiment with the configuration of another embodiment or to add the configuration of another embodiment to the configuration of one embodiment.

Also, a part of the configuration of each embodiment can be added, deleted, or replaced with another configuration. Each of the configurations, functions, processing units, processing means, and the like described above may be achieved in hardware by designing some or all of those in an integrated circuit, for example.

Further, each of the configurations, functions, and the like may be achieved in software by a processor interpreting and executing a program for achieving each of the functions.

Information such as a program, a table, or a file for achieving each function can be placed in a memory, a recording device such as a hard disk, a solid-state drive (SSD), or a recording medium such as an integrated circuit (IC) card, a secure digital (SD) card, or a digital versatile disc (DVD).

In addition, control lines and information lines considered to be necessary for description are indicated, and not all control lines and information lines are necessarily indicated in a product. In practice, almost all configurations may be considered to be interconnected.

Further, the communication means connecting the respective devices is not limited to the wireless LAN but may be changed to a wired LAN or other communication means.

REFERENCE SIGNS LIST 1 welder
2 welding target 2v welding-target simulated part
3 shading surface
3v head-mounted display
4 torch
4v simulated torch
4x absorbing film
5 semi-automatic welding power source
6 myoelectric sensor
7 simple electroencephalograph
11 control device
11b type control device
12 electric measurement device
13 marker
14 marker measuring camera
16 environment measurement device
17 force plate
21 posture information detection unit (detection unit)
22 posture information storage unit (storage unit)
23 posture information calculation unit (calculation unit)
24 posture information notification unit (notification unit)
31 operator information input unit
32 type classification unit

The invention claimed is:

1. A work support device comprising:
a storage unit that stores posture associated information associated with workability being an evaluation criterion at a time of a posture for each piece of posture information of an operator;
a detection unit that acquires posture information of the operator during work as current posture information;
a calculation unit that obtains, from the posture associated information, ideal posture information for making improvement on workability of the current posture information, obtained by referring to the posture associated information in the storage unit from the current posture information and comparing the current posture information to a posture information indicative of a fatigue degree that causes fatigue to identify the ideal posture information, wherein the comparison of the current posture information includes comparing a lateral width of a first position on an arm relative to a shoulder position, and a height of the first position on the arm relative to the shoulder position to a corresponding lateral width and height of a posture information indicative of a fatigue degree that causes fatigue; and
a notification unit that notifies the ideal posture information obtained by the calculation unit as an improvement proposal.

2. A work support device comprising:
a storage unit that stores posture associated information associated with workability being an evaluation criterion at a time of a posture for each piece of posture information of an operator;
a detection unit that acquires posture information of the operator during work as current posture information;
a calculation unit that obtains workability of the current posture information, obtained by referring to the posture associated information in the storage unit from the current posture information and comparing the current posture information to a posture information indicative of a fatigue degree that causes fatigue to identify the ideal posture information, wherein the comparison of the current posture information includes comparing a lateral width of a first position on an arm relative to a shoulder position, and a height of the first position on the arm relative to the shoulder position to a corresponding lateral width and height of a posture information indicative of a fatigue degree that causes fatigue; and
a notification unit that associates the posture associated information in the storage unit with the workability of the current posture information, obtained by the calculation unit, in the posture associated information and notifies the obtained information as an improvement proposal.

3. The work support device according to claim 1, wherein
the detection unit acquires position information of an arm holding a work instrument as the current posture information, and
the calculation unit refers to the posture associated information and calculates an amount of activity of the arm holding the work instrument as the workability of the current posture information.

4. The work support device according to claim 1, further comprising
a type classification unit that selects the posture associated information suitable for the operator from a plurality of pieces of the posture associated information, stores the selected posture associated information into the storage unit, and causes the calculation unit to refer to the stored posture associated information.

5. The work support device according to claim 1, wherein the notification unit uses a screen of a head-mounted display worn by the operator as an output destination to which the improvement proposal is notified.

6. The work support device according to claim 1, wherein the notification unit notifies the improvement proposal as sound information.

7. A work support method in which a work support device includes a storage unit, a detection unit, a calculation unit, and a notification unit, the work support method comprising:
by the storage unit, storing posture associated information associated with workability being an evaluation criterion at a time of a posture for each piece of posture information of an operator;
by the detection unit, acquiring posture information of the operator during work as current posture information;
by the calculation unit, obtaining, from the posture associated information, ideal posture information for making improvement on workability of the current posture information, obtained by referring to the posture associated information in the storage unit from the current posture information and comparing the current posture information to a posture information indicative of a fatigue degree that causes fatigue to identify the ideal posture information, wherein the comparison of the current posture information includes comparing a lateral width of a first position on an arm relative to a shoulder position, and a height of the first position on the arm relative to the shoulder position to a corresponding lateral width and height of a posture information indicative of a fatigue degree that causes fatigue; and
by the notification unit, notifying the ideal posture information obtained by the calculation unit as an improvement proposal.

8. The work support device according to claim 2, wherein
the detection unit acquires position information of an arm holding a work instrument as the current posture information, and
the calculation unit refers to the posture associated information and calculates an amount of activity of the arm holding the work instrument as the workability of the current posture information.

9. The work support device according to claim 2, further comprising
a type classification unit that selects the posture associated information suitable for the operator from a plurality of pieces of the posture associated information, stores the selected posture associated information into the storage unit, and causes the calculation unit to refer to the stored posture associated information.

10. The work support device according to claim 2, wherein the notification unit uses a screen of a head-mounted display worn by the operator as an output destination to which the improvement proposal is notified.

11. The work support device according to claim 2, wherein the notification unit notifies the improvement proposal as sound information.

* * * * *